United States Patent [19]

Green et al.

[11] Patent Number: 5,346,435
[45] Date of Patent: Sep. 13, 1994

[54] CARCASS HIDE OPENING

[75] Inventors: Paul A. Green, Cannon Hill; Russel J. Rankin, Clear Mountain; Phillip R. Boyce, Murrarrie; Raymond M. White, Capalba; John W. Buhot, Coorparoo; Darryl J. Heidke, Morningside; Andrew M. Leiner, Sunnybank; Andrew L. Finney, Marsden; Matthew Aqualini, Mt Gravatt; Edward G. Mills, Wilston; Richard J. Gibbons, Cannon Hill; John C. Abood, Capalaba; David G. Roberts, Cleveland; David P. Thomas, Morningside, all of Australia

[73] Assignees: Commonwealth Scientific and Industrial Research Organisation; Meat Research Corporation, both of Sydney, Australia

[21] Appl. No.: 910,181
[22] PCT Filed: Dec. 6, 1991
[86] PCT No.: PCT/AU91/00567
 § 371 Date: Jul. 16, 1992
 § 102(e) Date: Jul. 16, 1992
[87] PCT Pub. No.: WO92/10102
 PCT Pub. Date: Jun. 25, 1992

[30] Foreign Application Priority Data

Dec. 6, 1990 [AU] Australia .............. PK 3748

[51] Int. Cl.⁵ ............................... A22B 5/20
[52] U.S. Cl. ..................... 452/160; 452/152
[58] Field of Search ............... 452/160, 152

[56] References Cited

U.S. PATENT DOCUMENTS

| 1,764,425 | 6/1930 | Thomas | 452/125 |
| 2,198,814 | 4/1940 | Hart | 30/286 |
| 4,157,617 | 6/1979 | Frith | 30/294 |
| 4,198,751 | 4/1980 | Egbert | 30/286 |
| 4,841,602 | 6/1989 | Vander Hoorn et al. | 452/160 |
| 5,139,457 | 8/1992 | Rankin et al. | 452/160 |
| 5,160,295 | 11/1992 | Bekkers | 452/160 |

FOREIGN PATENT DOCUMENTS

| 2228/66 | 9/1967 | Australia . |
| 44587/72 | 1/1972 | Australia . |
| 59941/73 | 3/1973 | Australia . |
| 175014 | 4/1935 | Switzerland . |

Primary Examiner—Willis Little
Attorney, Agent, or Firm—Lowe, Price, LeBlanc & Becker

[57] ABSTRACT

Apparatus for opening a carcass hide preparatory to removal of the hide (20) from the carcass (26). The apparatus includes a clearing blade (11) with a leading cutting edge (16) which is inserted between the hide (20) and subcutaneous tissues (21) and is advanced along the carcass (26) to separate the hide (20). An opening blade (31) trails behind the clearing blade (11) and creates an opening cut along the hide. The hide edges (22, 23) peel up and outwardly and can be clamped. A drive arrangement (50) includes a mounting (51) for the clearing blade (11) and the opening blade (30) and drive means (52) to advance the mounting (51) along a track (56) located adjacent to the carcass (26). Rump lifting means (65) elevates the carcass rump to the desired height for starting the hide opening at the cleared opening (61) at the anus.

15 Claims, 6 Drawing Sheets

CARCASS HIDE OPENING

BACKGROUND OF THE INVENTION

This invention relates to the opening of the hide of a carcass during carcass processing operations preparatory to removal of the hide.

The presently widely used method of opening the hide of a carcass such as a beef carcass is substantially a manual operation. The beef carcass is hung from overhead supports by the rear legs. In this position, the hide is opened up manually by slaughtermen. The carcass hide is then cut away from the rear legs, belly and brisket in a manner suitable to the type of hide puller being used on the processing line. The labour involved in this operation adds substantially to the total cost of processing the carcass.

SUMMARY OF THE INVENTION

It is an object of the present invention to provide apparatus for opening a carcass hide and which is susceptible to at least partial mechanisation, and preferably enabling automation of the process of opening the hide.

According to the present invention there is provided apparatus for opening a carcass hide preparatory to removal of the hide from the carcass, characterised in that the apparatus includes a clearing member which is operable to be inserted between the hide and subcutaneous tissues and to be advanced along an advancement line extending along a length of the carcass, the clearing member having a leading extremity extending transverse to the advancement line and which is operative to separate the hide from the subcutaneous tissues as it advances, the apparatus further including an opening means located so as to trail behind the leading extremity of the clearing member as the clearing member is advanced along the advancement line, the opening means being operative to cut the hide to create an opening cut in the hide along the advancement line, the apparatus further including a drive arrangement associated with the clearing member and the opening means and operative to advance the clearing member and opening means along the carcass to separate the hide from the subcutaneous tissues and to create the opening cut in the hide along the advancement line.

Preferably the leading extremity of the clearing member extends in use generally parallel to the outside surface of the hide so as to promote separation of the hide from the subcutaneous tissues at the boundary between the hide and the tissues. The leading extremity of the clearing member preferably tapers in a forward direction relative to the advancement line and towards a nose portion of the leading extremity. The nose portion is preferably rounded in plan view to minimise the risk of the nose portion penetrating into the subcutaneous tissues or penetrating into the hide.

Preferably the leading extremity of the clearing member comprises a cutting edge operative to sever connections between the hide and the subcutaneous tissues. The leading extremity of the clearing member may be bevelled from an inner face of the clearing member which is adjacent to the subcutaneous tissues to the cutting edge located at or slightly below an outer face of the clearing member which is adjacent to the hide.

In the preferred embodiment the clearing member comprises a clearing blade and the leading extremity comprises a leading edge of the clearing blade which extends transverse to the advancement line and which penetrates the boundary between the hide and subcutaneous tissues so as to separate the hide from the subcutaneous tissues as the clearing blade advances.

Also in the preferred embodiment the opening means comprises an opening blade having a cutting edge operative to cut the hide to create the opening cut in the hide along the advancement line. The cutting edge of the opening blade may extend outwardly from the clearing member and may be located rearwardly of the leading extremity of the clearing member so that as the clearing member and the opening blade advance and the clearing member separates the hide from subcutaneous tissues, the cutting edge of the opening blade cuts the hide to open it along the advancement line. Preferably the cutting edge of the opening blade extends outwardly in a plane at right angles to the general plane of the clearing member and its leading extremity thereof, the cutting edge of the opening blade being inclined rearwardly relative to the advancement line.

The apparatus may further include peeling means operative to peel the hide on both sides of the cut line upwardly and outwardly away from the opening cut thereby exposing the subcutaneous tissues, the peeling means comprising peeling guides located rearwardly of the cutting edge of the opening blade, the peeling guides flaring upwardly and outwardly away from the clearing member so as to thereby cause the edges of the hide immediately behind the opening cut to peel upwardly and outwardly. In an alternative (or in addition), the opening blade may be wedge shaped in cross section with the point of the wedge shape constituting the cutting edge, the wedge shape of the opening blade causing the edges of the hide immediately behind the cut to be forced apart as the opening blade advances.

The drive arrangement may include a mounting which mounts the clearing member and the opening means, the drive arrangement further including a guide which is arranged to be located in the vicinity of the carcass and drive means for driving the mounting along the guide so as to cause the clearing member and opening means to travel along the length of carcass. The guide may comprise a guide track, the mounting including a track follower operative to travel along the track so that the track follower in use moves generally along the advancement line in proximity to the carcass. Preferably the mounting enables the clearing member and opening means to move towards and away from the guide track as movement along the advancement line occurs so as to thereby assist the clearing member and opening means to follow the contour of the carcass. The mounting may include biasing means operative to apply a biasing force urging the clearing member and opening means away from the carcass and towards the guide track thereby assisting in separating the hide from the subcutaneous tissues as the clearing member advances.

Preferably the apparatus is operative to cut the hide of a carcass supported in an inverted position with the belly of the carcass facing upwardly, the carcass having undergone a operation of bagging and bunging the anus so as to leave a cleared opening in the hide, the apparatus being operative to commence the hide clearing and cutting at the cleared opening at the anus with the advancement line extending along the belly, thorax and neck of the carcass, the apparatus preferably further including rump lifting means operative to selectively elevate the rump of the carcass so as to present the cleared opening at the anus at the desired height for entry of the clearing member through the cleared opening at the anus.

The apparatus may include clamping means operative to clamp the edges of the hide behind the opening means relative to the advancement line and to hold the hide edges away from the subcutaneous tissues as the clearing member and opening means advance, the clamping means being operative to clamp progressively the hide edges at points along the hide edges as the clearing member and opening means are advanced.

Possible and preferred features of the present invention will now be described with particular reference to the accompanying drawings. However it is to be understood that the features illustrated in an described with reference to the drawings are not to be construed as limiting on the scope of the invention. In the drawings:

DETAILED DESCRIPTION OF THE PREFERRED EMBODIMENTS

Figure 1:
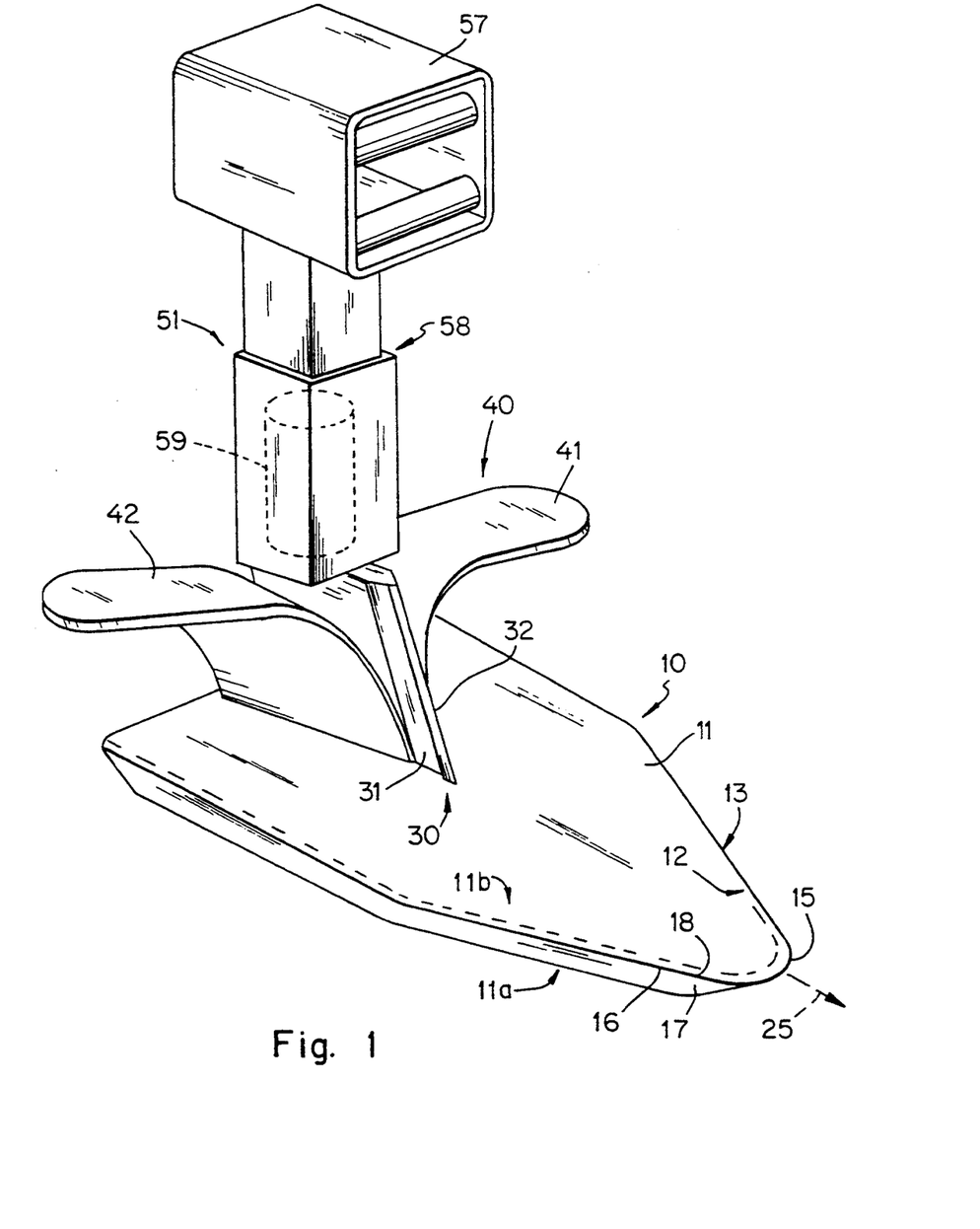
FIG. 1 shows a perspective view of a clearing blade and opening blade usable in the present invention.
Figure 2:
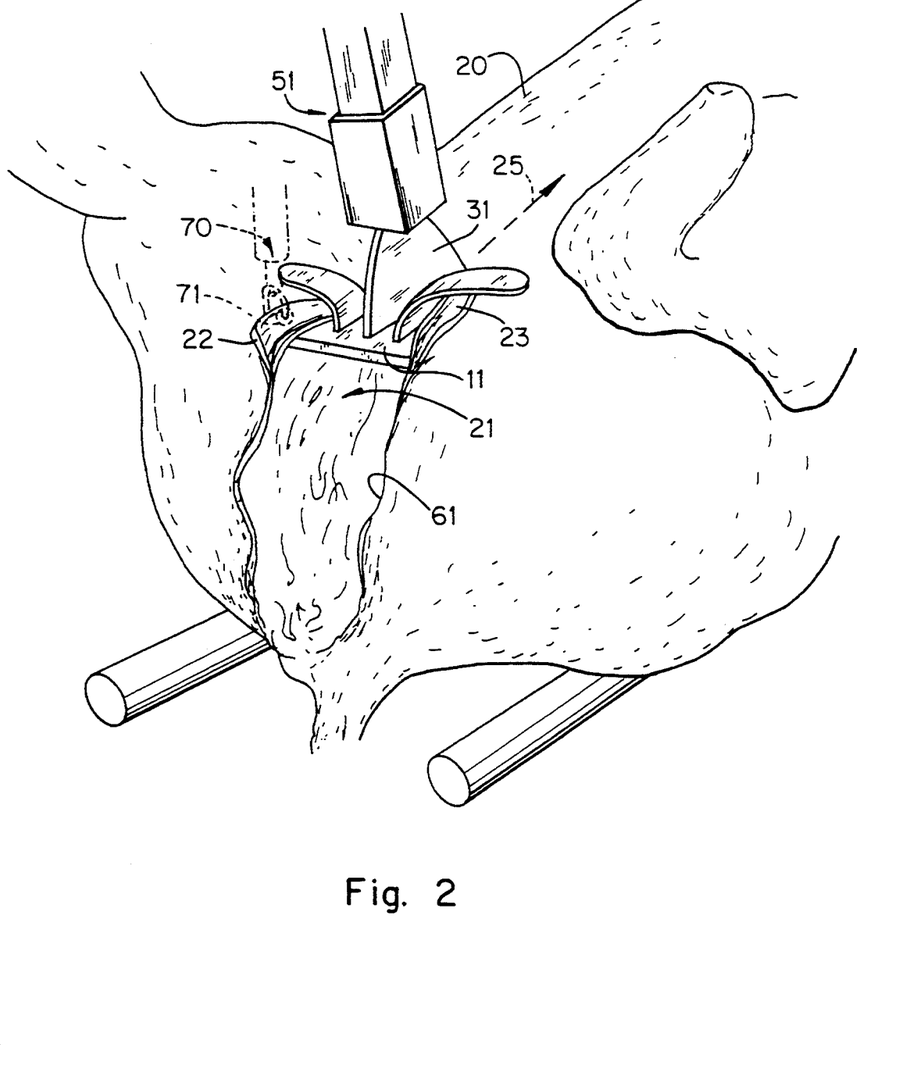
FIG. 2 shows the commencement of operation of an apparatus according to the invention showing the hide being peeled outwardly and clamped.

Referring to FIGS. 1 and 2 of the drawings, the apparatus includes a clearing member 10 in the form of a flat generally V shaped blade 11. The clearing member 10 has a leading extremety 12 in the form of a sharpened leading edge 13. In use, the blade 11 and its leading edge 13 are generally parallel to the outside surface of the hide 20 so as to promote separation of the hide 20 from the subcutaneous tissues 21.

The leading edge 13 tapers towards a nose portion 15 which is rounded to minimise the risk of the nose 15 penetrating either subcutaneous tissues or hide. The edge 13 comprises a cutting edge 16 to sever connections between the hide 20 and subcutaneous tissues 21. The cutting edge 16 is defined between the bevel 17 extending from the inner face 11a which is adjacent to the subcutaneous tissues 21 in use and the slight bevel 18 at the outer face 11b of blade 11 which is adjacent to the hide 20.

The apparatus includes an opening means 30 in the form of an opening blade 31 which trails behind the leading cutting edge 16 as the clearing blade 11 is advanced along the advancement line 25. The blade 31 cuts the hide 20 to create an opening cut in the hide along the advancement line 25. The opening blade 31 has an edge 32 which extends outwardly from the plane of the clearing blade 11 so that as the clearing and opening blades 11, 31 advance and the clearing blade 11 separates the hide 20 from subcutaneous tissues 21, the blade edge 32 cuts the hide. The blade 31 extends in a plane generally at right angles to the plane of the clearing blade 11 and the blade edge 32 is inclined rearwardly relative to advancement line 25, e.g. at about 45°.

The apparatus in FIGS. 1 and 2 includes peeling means 40 arranged to peel the hide 20 away from the cut line so as to expose the subcutaneous tissues 21. The peeling means 40 comprises upwardly and outwardly curved guides 41, 42 on opposite sides of the opening blade 31 and these function to turn the edges 22, 23 of the hide upwardly and outwardly away from the sterile meat surface as the hide 20 is being opened.

The apparatus includes a drive arrangement 50 (FIG. 3) operative to advance the clearing and opening blades 11, 31 along the carcass 26. The drive arrangement 50 includes a mounting 51 which mounts the clearing and opening blades 11, 31. The mounting is movable by drive means 52, shown schematically in FIG. 3 as a winch 53 and cable 54 extending to the mounting 51. The mounting is drivable along a guide 55 located in use in the vicinity of the carcass 26. The guide 55 comprises a guide track 56 with the mounting 51 including a track follower 57 arranged to travel along the track 56.

The mounting 51 is arranged to enable the clearing and opening blades 11, 31 to move relative to the guide track 56 as advancing movement occurs so as to enable the blades 11, 31 to generally follow the contour of the carcass 26. In FIG. 1, the mounting 51 comprises a telescopically extendable connection 58 between the track follower 57 and the blades 11, 31 so that the blades are movable towards and away from the track follower 57 as it advances along the guide track 56. Biasing means 59 applies a biasing force either to urge the blades 11, 31 away from the carcass 26 and towards the track 56 to assist in pulling of the hide 20 away from the subcutaneous tissues 21 or, if desired, towards the carcass 26 to locate the blades 11, 31.

Figure 4:
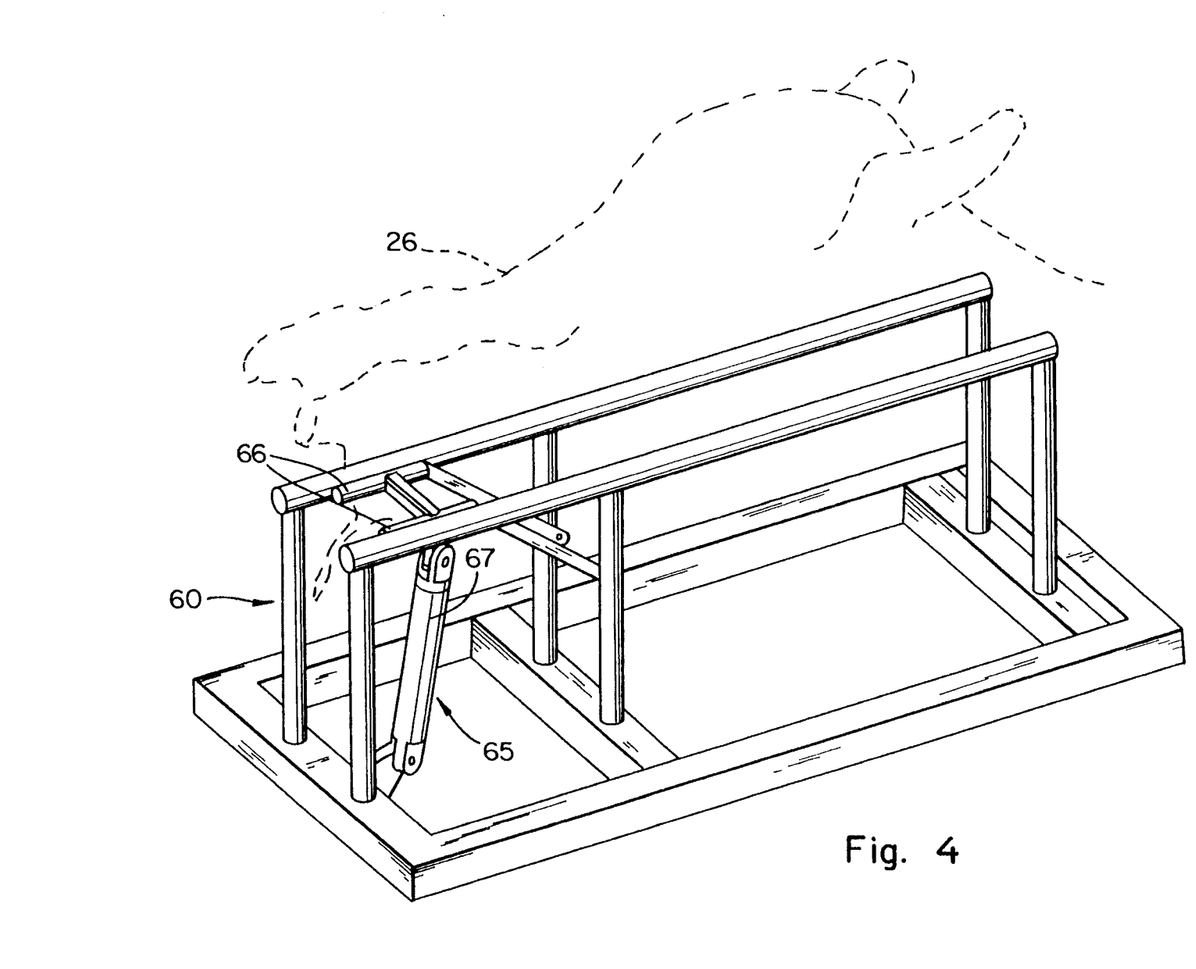
FIG. 4 shows a perspective view of a support for a carcass incorporating rump lifting means.
Figure 5:
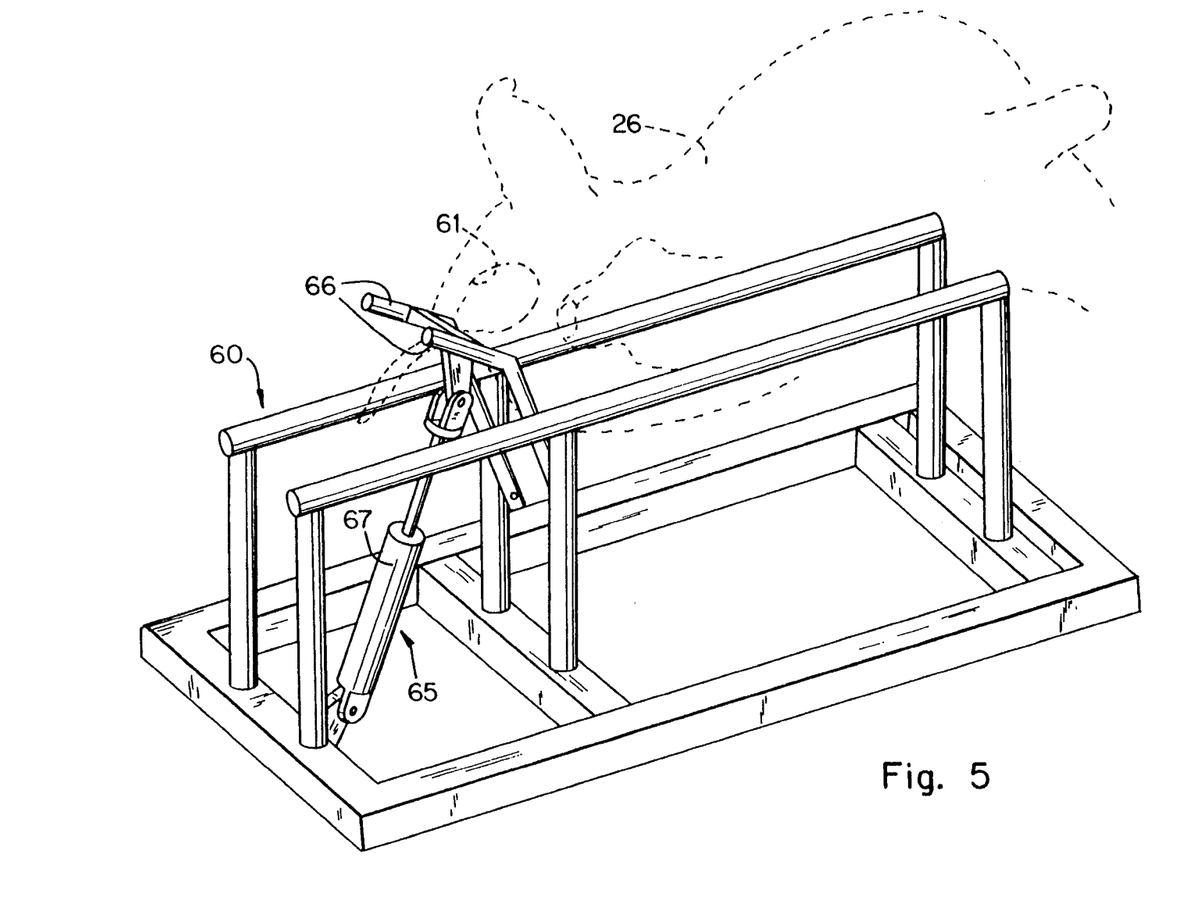
FIG. 5 is a view similar to FIG. 4 showing the carcass rump lifted.

Referring to FIGS. 4 and 5, the carcass 26 is in use preferably supported by a support cradle 60 so that the carcass 26 is in an inverted position with the belly of the carcass facing upwardly. Preferably the carcass 26 has undergone an operation of bagging and bunging the anus so as to leave a cleared opening 61 in the hide 20 and the hide clearing and cutting operation commences at the cleared opening 61 with the advancement line 25 extending along the belly, thorax and neck of the carcass 26. In FIGS. 4 and 5, there is shown rump lifting means 65 shown as pivoted rump support arms 66 which initially are in a lowered position within the support cradle 60 (FIG. 4). To position the carcass ready for commencement of the hide opening operation, the ram 67 can be selectively operated to elevate the rump of the carcass 26 so as to present the cleared opening 61 at the predetermined desired height for initial entry of the nose 15 of the clearing blade 11.

In FIG. 2 there is also illustrated schematically clamping means 70 operative to clamp the edges 22, 23 of the hide behind the opening blade 31 and to hold the hide edges 22, 23 away from the subcutaneous tissues 21 as the clearing and opening blades 11, 31 advance. If desired, the clamping means 70 may be provided along the length of the carcass to progressively clamp the hide edges 22, 23 at successive points as the clearing and opening blades 11, 31 are advanced. The clamping means 70 are illustrated as comprising selectively operated clamping jaws 71 which can be initially open and have associated sensors (not shown) which determine when the hide edges 22, 23 being peeled away from the carcass enter into the space between the open jaws 71 thereby enabling actuation and closing of the jaws 71 to clamp the hide edges.

Figure 6:
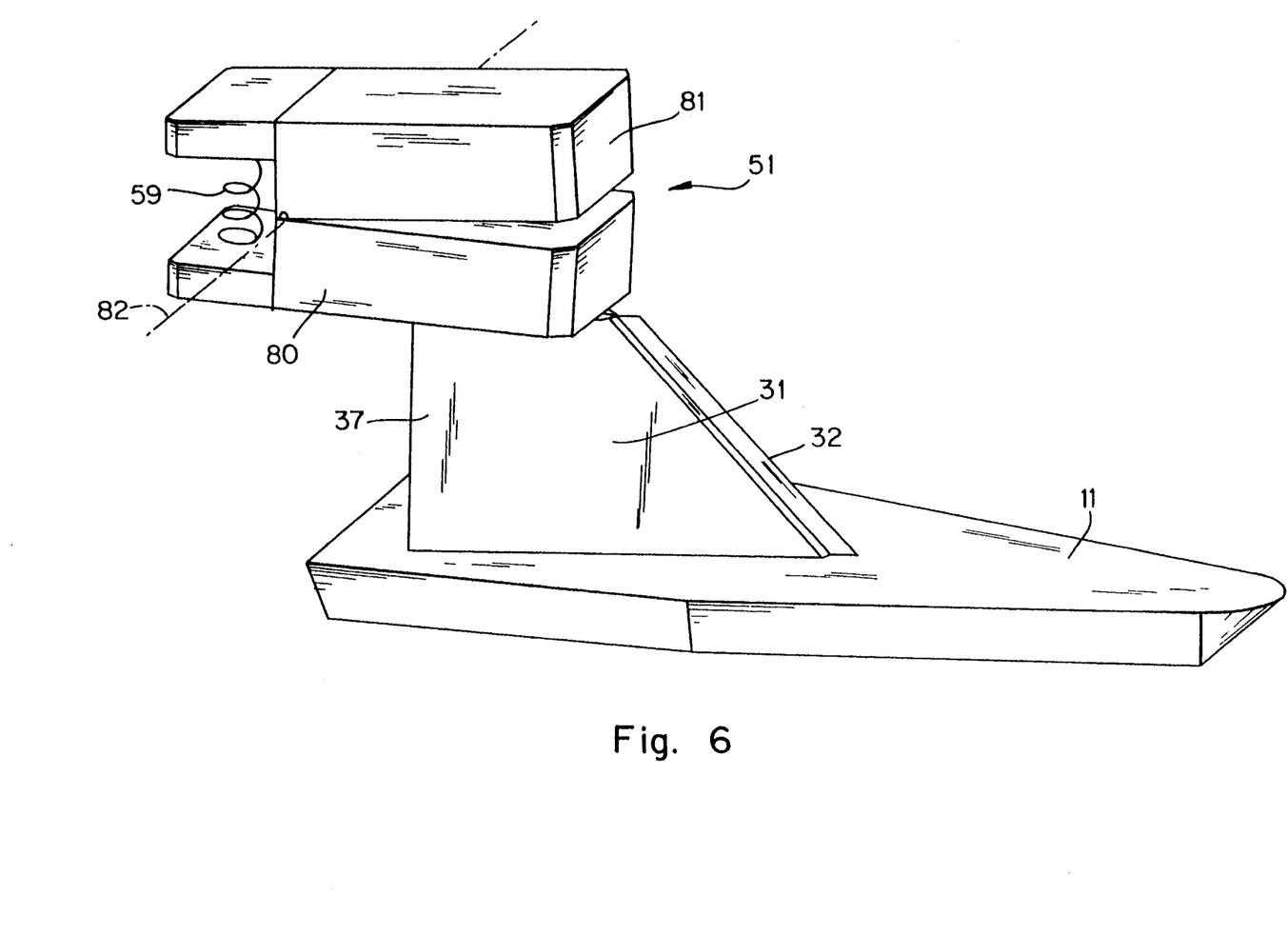
FIG. 6 shows a perspective view of an alternative form of a clearing blade and opening blade and mounting to what is shown in FIG. 1.

In FIG. 6 there is shown an alternative embodiment of the clearing blade 11 and opening blade 31 and associated mount 51. In this arrangement, the opening blade 31 is wedge shaped in plan view so that the thickness or width of the blade 31 at its trailing end 37 is substantially greater than towards the blade edge 32. This wedge shaped opening blade 31 promotes peeling of the hide edges upwardly and outwardly without the need for the peeling guides 41, 42 provided in FIG. 1.

Also in FIG. 6, the mounting 51 is shown as a pivoted mounting with one portion 80 being rigidly secured to the blades 11, 31, the other portion 81 being secured to the track follower 57 (not shown in FIG. 6). The parts 80, 81 are pivotally movable about a transverse axis 82 and the biasing means 59 biases the nose portion of the blade 11 downwardly. This limited pivoting movement enables the blade 11 to contour up over the rump and into the cleared opening 61 to commence the hide opening operation. After initial location and commencement of the hide opening operation, the pivoting movement of the parts 80, 81 may be prevented by selectively operating locking means.

Figure 3:
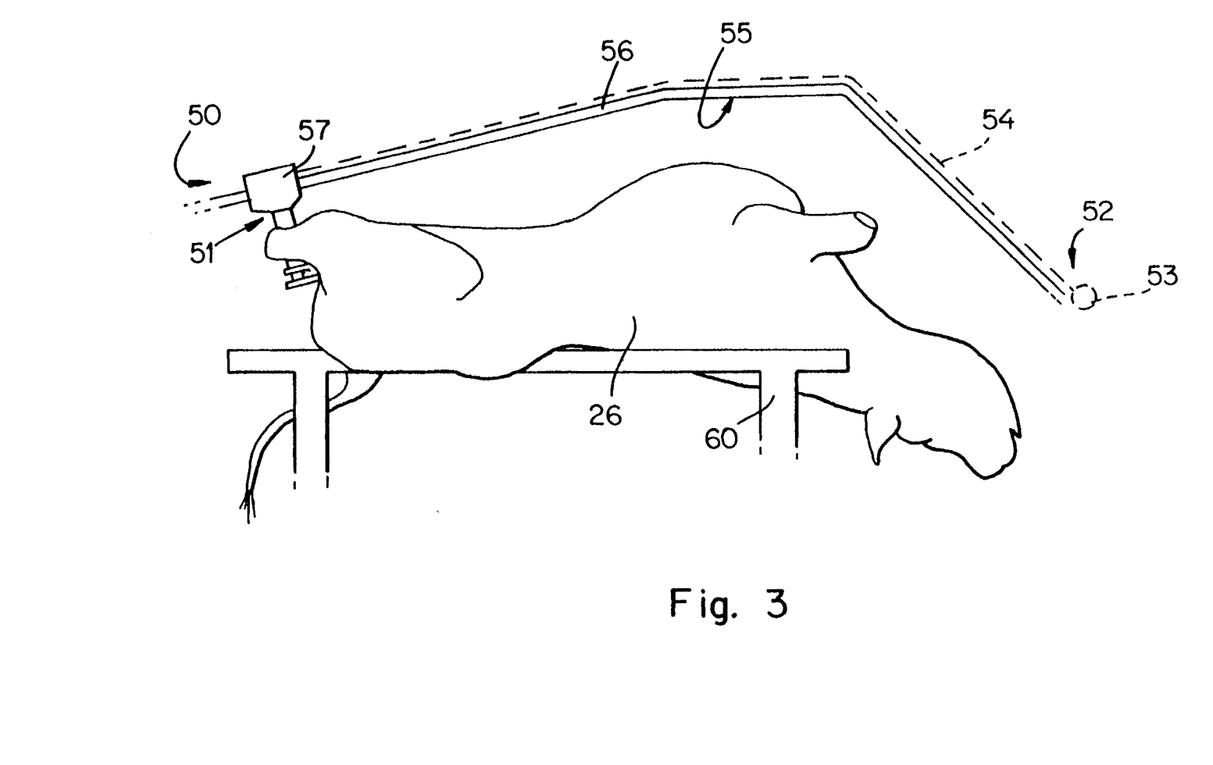
FIG. 3 shows a side view of a beef carcass and an apparatus according to the present invention located in operative association to the carcass.

In operation, the carcass after stunning, sticking, horn removal and hock removal, is inverted onto its back and supported in a bed dressing cradle. The carcass can be conveyed by the bed dressing cradle through various stages in which the hide is to be removed. With the carcass positioned generally as shown in FIG. 3 so that the guide is positioned centrally over the belly of the inverted carcass, the guide may be adjusted so as to be at approximately equal distances above the carcass at both the head and tail ends.

The blades may then be advanced so as to enter under the hide at the rear of the carcass, preferably at the bunged anus which has been prepared and sealed ready for opening of the hide along the longitudinal line of the belly. The drive arrangement then powers the blades along the guide track from the rear of the carcass to the neck. The clearing blade lifts the hide and at the same time cuts hide away from the subcutaneous tissues.

The shape of the nose of the clearing blade and the bevelled edge on the clearing blade minimises the risk of damage to the hide or to the subcutaneous tissues. That is, the clearing blade does not tend to cut too deeply into subcutaneous tissues thus losing valuable meat cuts which would otherwise remain attached to the hide and also does not cut into the hide from the under surface thereby damaging the hide and/or leaving portions of hide attached to the subcutaneous tissue to be recovered as saleable meat.

As the apparatus opens the hide and clears a strip of hide, the peeling means folds back the edges of the hide away from the sterile meat surface enabling access to the peeled back hide edges for clamping and further processing, particularly hide pulling.

The arrangement of the guide track assists maintenance of a degree of tension away from the carcass between the clearing blade and the hide.

It will be seen that the apparatus as particularly described herein and as illustrated enables mechanised and at least partially automated opening of the hide of a carcass. The subcutaneous tissues can be maintained sterile by peeling back the hide edges. This also makes the hide edges available for clamping by means involved in pulling the hide from the carcass at the next state of carcass processing.

It is to be understood that various alterations, modifications and/or additions may be made to the features of the possible and preferred embodiment(s) of the invention as herein described without departing from the scope of the invention as defined in the claims.

We claim:

1. Apparatus for opening a carcass hide preparatory to removal of the hide from the carcass, the apparatus includes a clearing member which is operable to be inserted between the hide and subcutaneous tissues and to be advanced along an advancement line extending along a length of the carcass, the clearing member having a leading extremity extending transverse to the advancement line and which is operative to separate the hide from the subcutaneous tissues as it advances, the apparatus further including an opening means located so as to trail behind the leading extremity of the clearing member as the clearing member is advanced along the advancement line, the opening means being operative to cut the hide to create an opening cut in the hide along the advancement line, the apparatus further including clamping means operative to clamp the edges of the hide behind the opening means relative to the advancement line and to hold the hide edges, the apparatus further including a mechanical drive arrangement associated with the clearing member and the opening means and operative to advance the clearing member and opening means along the carcass away from the clamping means so that the clearing member separates the hide from the subcutaneous tissues and the opening means creates the opening cut in the hide along the advancement line.

2. Apparatus as claimed in claim 1 characterized in that the opening means comprises an opening blade having a cutting edge operative to cut the hide to create the opening cut in the hide in the hide along the advancement line.

3. Apparatus as claimed in claim 2 wherein the cutting edge of the opening blade extends outwardly from the clearing member and is located rearwardly of the leading extremity of the clearing member so that as the clearing member and the opening blade advance and the clearing member separates the hide from subcutaneous tissues, the cutting edge of the opening blade cuts the hide to open it along the advancement line.

4. Apparatus as claimed in claim 3 wherein the cutting edge of the opening blade extends outwardly in a plane at right angles to the general plane of the clearing member and its leading extremity thereof, the cutting edge of the opening blade being included rearwardly relative to the advancement line.

5. Apparatus as claimed in claim 2 wherein the opening blade is wedge shaped in cross section with the point of the wedge shape constituting the cutting edge, the wedge shape of the opening blade causing the edges of the hide immediately behind the cut to be forced apart as the opening blade advances.

6. Apparatus as claimed in claim 1 wherein the drive arrangement includes a mounting which mounts the clearing member and the opening means, the drive arrangement further including a guide which is arranged to be located in the vicinity of the carcass and drive means for driving the mounting along the guide so as to cause the clearing member and opening means to travel along the length of carcass.

7. Apparatus as claimed in claim 6 wherein the guide comprises a guide track, the mounting including a track follower operative to travel along the track so that the track follower in use moves generally along the advancement line in proximity to the carcass.

8. Apparatus as claimed in claim 7 wherein the mounting enables the clearing member and opening means to move towards and away from the guide track as movement along the advancement line occurs so as to thereby assist the clearing member and opening means to follow the contour of the carcass.

9. Apparatus as claimed in claim 1 wherein the leading extremity of the clearing member extends in use generally parallel to the outside surface of the hide so as to promote separation of the hide from the subcutaneous tissues at the boundary between the hide and the tissues, the leading extremity of the clearing member tapering in a forward direction relative to the advancement line and towards a nose portion of the leading extremity, the nose portion being rounded in plain view to minimize the risk of the nose portion penetrating into the subcutaneous tissues or penetrating into the hide.

10. Apparatus as claimed in claim 1 wherein the clearing member comprises a clearing blade and the leading extremity comprises a leading edge of the clearing blade which extends transverse to the advancement line and which penetrates the boundary between the hide and subcutaneous tissues so as to separate the hide from the subcutaneous tissues as the clearing blade advances, the separation of the hide from the subcutaneous tissues occurring across a substantial width so as to clear a strip of hide which is cut by the opening means to form the edges which are cleared from the subcutaneous tissues by sufficient width to enable clamping of the edges by the clamping means.

11. Apparatus as claimed in claim 1 wherein the clamping means is operative to hold the hide edges away from the subcutaneous tissues as the clearing member and opening means advance, the clamping means being operative to clamp progressively the hide edges at points along the hide edges as the clearing member and opening means are advanced.

12. Apparatus for opening a carcass hide preparatory to removal of the hide from the carcass, the apparatus including a clearing member which is operable to be inserted between the hide and subcutaneous tissues and to be advanced along an advancement line extending along a length of the carcass, the clearing member having a leading extremity extending transverse to the advancement line and which is operative to separate the hide from the subcutaneous tissues as it advances, the leading extremity of the clearing member comprising a cutting edge operative to sever connections between the hide and the subcutaneous tissues, the clearing member having an inner face which is adjacent to the subcutaneous tissues and an outer face which is adjacent to the hide, the cutting edge being located at or slightly below the outer face of the clearing member and the leading extremity of the clearing member being bevelled from the inner face to the cutting edge, the apparatus further including an opening means located so as to trail behind the leading extremity of the clearing member as the clearing member is advanced along the advancement line, the opening means being operative to cut the hide to create an opening cut in the hide along the advancement line, the apparatus further including a drive arrangement associated with the clearing member and the opening means and operative to advance the clearing member and opening means along the carcass so that the clearing member separates the hide from the subcutaneous tissues and the opening means creates the opening cut in the hide along the advancement line.

13. Apparatus for opening a carcass hide preparatory to removal of the hide from the carcass, the apparatus including a clearing member which is operable to be inserted between the hide and subcutaneous tissues and to be advanced along an advancement line extending along a length of the carcass, the clearing member having a leading extremity extending transverse to the advancement line and which is operative to separate the hide from the subcutaneous tissues as it advances, the apparatus further including an opening means located so as to trail behind the leading extremity of the clearing member as the clearing member is advanced along the advancement line, the opening means being operative to cut the hide to create an opening cut in the hide along the advancement line, the apparatus further including a drive arrangement associated with the clearing member and the opening means and operative to advance the clearing member and opening means along the carcass so that the clearing member separates the hide from the subcutaneous tissues and the opening means creates the opening cut in the hide along the advancement line, the apparatus further including peeling means operative to peel the hide on both sides of the opening cut upwardly and outwardly away from the opening cut thereby exposing the subcutaneous tissues, the opening means comprising an opening blade having a cutting edge operative to cut the hide to create the opening cut, the opening means being operative to cut the hide to create an opening cut in the hide along the advancement line, the apparatus further including a drive arrangement associated with the clearing member and opening means and operative to advance the clearing member and opening means along the carcass so that the clearing member separates the hide from the subcutaneous tissues and the opening means creates the opening cut in the hide along the advancement line.

14. Apparatus for opening a carcass hide preparatory to removal of the hide from the carcass, the apparatus including a clearing member which is operable to be inserted between the hide and subcutaneous tissues and to be advanced along an advancement line extending along a length of the carcass, the clearing member having a leading extremity extending transverse to the advancement line and which is operative to separate the hide from the subcutaneous tissues as it advances, the apparatus further including an opening means located so as to trail behind the leading extremity of the clearing member as the clearing member is advanced along the advancement line, the opening means being operative to cut the hide to create an opening cut in the hide along the advancement line, the apparatus further including a drive arrangement associated with the clearing member and the opening means and operative to advance the clearing member and opening means along the carcass so that the clearing member separates the hide from the subcutaneous tissues and the opening means creates the opening cut in the hide along the advancement line, the drive arrangement including a mounting which mounts the clearing member and the opening means, the drive arrangement further including a guide which is arranged to be located in the vicinity of the carcass and drive means for driving the mounting along the guide so as to cause the clearing member and opening means to travel along the length of the carcass, the guide comprising a guide track, the mounting including a track follower operative to travel along the track so that the track follower in use moves generally along the advancement line in proximity to the carcass, the mounting enabling the clearing member and opening means to move towards and away from the guide track as movement along the advancement line occurs so as to thereby assist the clearing member and opening means to follow the contour of the carcass, the mounting includes biasing means operative to apply a biasing force urging the clearing member and opening means away from the carcass and towards the guide tack thereby assisting in separating the hide from the subcutaneous tissues as the clearing member advances.

15. Apparatus for opening a carcass hide preparatory to removal of the hide from the carcass, the apparatus including a clearing member which is operable to be inserted between the hide and subcutaneous tissues and to be advanced along an advancement line extending along a length of the carcass, the clearing member having a leading extremity extending transverse to the advancement line and which is operative to separate the hide from the subcutaneous tissues as it advances, the apparatus further including an opening means located so as to trail behind the leading extremity of the clearing member as the clearing member is advanced along the advancement line, the opening means being operative to cut the hide to create an opening cut in the hide along the advancement line, the apparatus further including a drive arrangement associated with the clearing member and the opening means and operative to advance the clearing member and opening means along the carcass so that the clearing member separates the hide from the subcutaneous tissues and the opening means creates the opening cut in the hide along the advancement line, the apparatus being operative to cut the hide of a carcass supported in an inverted position with the belly of the carcass facing upwardly, the carcass having undergone an operation of bagging and bunging the anus so as to leave a cleared opening in the hide, the apparatus being operative to commence the hide clearing and cutting at the cleared opening at the anus with the advancement line extending along the belly, thorax and the neck of the carcass, the apparatus further including rump lifting means operative to selectively elevate the rump of the carcass so as to present the cleared opening at the anus at the desired height for entry of the clearing member through the cleared opening at the anus.

* * * * *